US010515091B2

(12) United States Patent
Malherbe et al.

(10) Patent No.: US 10,515,091 B2
(45) Date of Patent: Dec. 24, 2019

(54) JOB POSTING DATA NORMALIZATION AND ENRICHMENT

(71) Applicant: MULTIPOSTING SAS, Paris (FR)

(72) Inventors: Emmanuel Malherbe, Paris (FR); Jean-Baptiste Gariel, Paris (FR); Shuai Zhang, Paris (FR); Loic Raucy, Paris (FR)

(73) Assignee: Multiposting SAS, Paris (FR)

( * ) Notice: Subject to any disclaimer, the term of this patent is extended or adjusted under 35 U.S.C. 154(b) by 229 days.

(21) Appl. No.: 15/363,527

(22) Filed: Nov. 29, 2016

(65) Prior Publication Data

US 2018/0150534 A1 May 31, 2018

(51) Int. Cl.
*G06F 17/30* (2006.01)
*G06F 16/25* (2019.01)
*G06Q 10/10* (2012.01)
*G06F 16/22* (2019.01)

(52) U.S. Cl.
CPC ............ *G06F 16/258* (2019.01); *G06F 16/22* (2019.01); *G06Q 10/1053* (2013.01)

(58) Field of Classification Search
CPC ........... G06F 17/30569; G06F 17/3089; G06F 17/30864; G06F 17/30312; G06F 16/258; G06F 16/958; G06F 16/951; G06F 16/22; G06Q 10/1053
USPC ....... 707/802, 803, 804, 807, 809, 811, 947; 705/321
See application file for complete search history.

(56) References Cited

U.S. PATENT DOCUMENTS

| | | | |
|---|---|---|---|
| 2004/0143469 A1* | 7/2004 | Lutz ...................... | G06Q 10/10 705/321 |
| 2008/0104542 A1* | 5/2008 | Cohen ................... | G06F 16/951 715/810 |
| 2011/0238591 A1* | 9/2011 | Kerr ....................... | G06Q 10/06 705/321 |
| 2011/0276507 A1* | 11/2011 | O'Malley .............. | G06Q 10/00 705/321 |
| 2012/0123956 A1* | 5/2012 | Chenthamarakshan .................... G06Q 10/10 705/321 |

(Continued)

OTHER PUBLICATIONS

Qiaoling Liu et al., Company Depot: Employer Name Normalization in Online Recruitment Industry, Aug. 2016, KDD' 16: Proceedings of the 22nd ACM SIGKDD International Conference on Knowledge Discovery and Data Mining; pp. 521-530 (Year: 2016).*

(Continued)

*Primary Examiner* — Greta L Robinson
(74) *Attorney, Agent, or Firm* — Fish & Richardson P.C.

(57) ABSTRACT

The present disclosure involves systems, software, and computer implemented methods for monitoring processes running on a platform as a service architecture. One example method includes extracting one or more electronic job postings from a plurality of job posting websites. For each extracted electronic job posting, data associated with the extracted electronic job posting is automatically normalized into a normalized electronic job posting in a structured format. Each normalized electronic job posting is automatically enriched to create an enriched electronic job posting based on data sources external to the job posting websites. Each enriched electronic job posting is stored in a job posting repository.

15 Claims, 7 Drawing Sheets

(56) References Cited

U.S. PATENT DOCUMENTS

| | | | | |
|---|---|---|---|---|
| 2014/0297550 | A1* | 10/2014 | Miller | G06Q 10/1053 705/321 |
| 2015/0120593 | A1* | 4/2015 | Madhavan | G06Q 10/1053 705/321 |
| 2015/0227892 | A1* | 8/2015 | Goel | G06Q 10/1053 705/321 |
| 2016/0092841 | A1* | 3/2016 | Kamat | G06Q 10/1053 705/40 |
| 2016/0307158 | A1* | 10/2016 | Tang | G06Q 10/1053 |
| 2017/0300862 | A1* | 10/2017 | Bhadouria | G06Q 10/1053 |
| 2018/0005192 | A1* | 1/2018 | Shacham | G06Q 10/1053 |
| 2018/0060822 | A1* | 3/2018 | Hou | G06Q 10/1053 |

OTHER PUBLICATIONS

Malherbe et al., "Bridge the Terminology Gap Between Recruiters and Candidates: A Multilingual Skills Base built from Social Media and Linked Data," 2016 IEEE/ACM International Conference on Advances in Social Networks Analysis and Mining (ASONAM), Aug. 2016, 8 pages.

Malherbe et al., "Bringing Order to the Job Market: Efficient Job Offer Categorization in E-Recruitment," Proceedings of the 38th International ACM SIGIR Conference on Research and Development in Information Retrieval, ACM, Aug. 2015, 4 pages.

Malherbe et al., "Field Selection for Job Categorization and Recommendation to Social Network Users," 2014 IEEE/ACM International Conference on Advances in Social Networks Analysis and Mining (ASONAM), Aug. 2014, 8 pages.

Malherbe et al., "From a Ranking System to a Confidence Aware Semi-Automatic Classifier," 19th International Conference on Knowledge Based and Intelligent Information and Engineering Systems, Sep. 2015, 10 pages.

* cited by examiner

JOB POSTING DATA NORMALIZATION AND ENRICHMENT

TECHNICAL FIELD

The present disclosure relates to computer-implemented methods, software, and systems for normalizing and enriching job posting data.

BACKGROUND

A job posting web site can be used by employers and job seekers. The job posting web site can enable employers to post job postings that describe job openings. A job seeker can use the job posting web site to browse and search for job postings. The job seeker can search for or filter the job postings by various criteria, such as location, skills, job description, or job title. The job seeker can select a particular job posting to view details regarding the job posting. The job posting web site can enable the job seeker to apply for the job posting.

SUMMARY

The present disclosure involves systems, software, and computer implemented methods for normalizing and enriching job posting data. One example method includes extracting one or more electronic job postings from a plurality of job posting websites. For each extracted electronic job posting, data associated with the extracted electronic job posting is automatically normalized into a normalized electronic job posting in a structured format. Each normalized electronic job posting is automatically enriched to create an enriched electronic job posting based on data sources external to the job posting websites. Each enriched electronic job posting is stored in a job posting repository.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Information related to a labor market can be included in many different employment-related websites. Job posting data can be extracted from multiple job posting sites, normalized, and enriched with external data. An analytics application can analyze the enriched job postings to provide analytics for users, such as recruiters, business managers, etc., who want to understand various aspects of the labor market.

Figure 1:
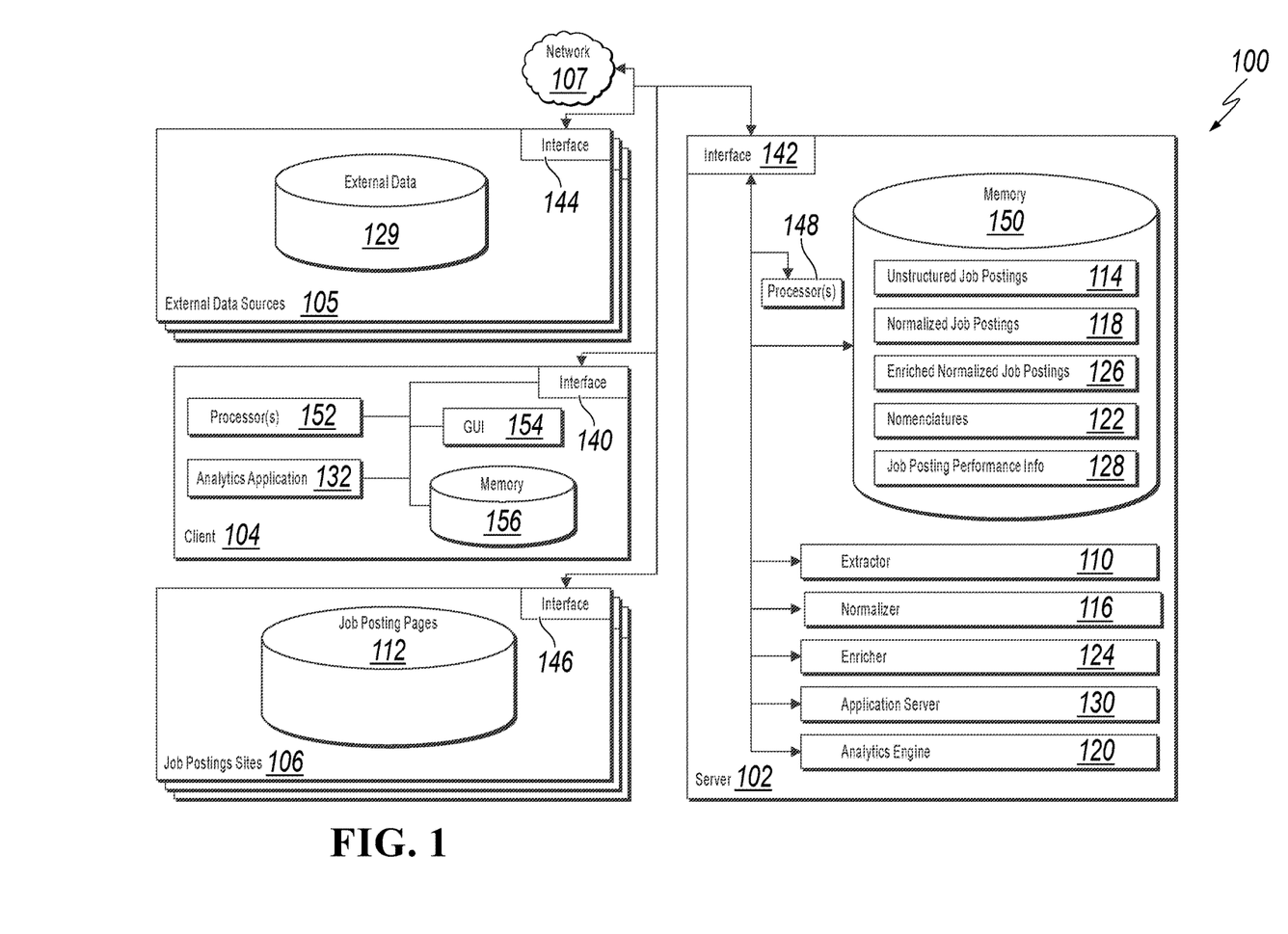
FIG. 1 is a block diagram illustrating an example system for normalizing and enriching job posting data.

FIG. 1 is a block diagram illustrating an example system 100 for normalizing and enriching job posting data. Specifically, the illustrated system 100 includes or is communicably coupled with a server 102, a client device 104, one or more external data sources 105, one or more job posting sites 106, and a network 107. Although shown separately, in some implementations, functionality of two or more systems or servers may be provided by a single system or server. In some implementations, the functionality of one illustrated system or server may be provided by multiple systems or servers.

An extractor 110 can extract job posting data from job posting pages 112 that are published by the job posting sites 106. The job posting sites 106 can include job boards, career sites, social networks, or other open data sites. The job posting pages 112 can include electronic job postings that are advertisements for job openings. The extractor 110 can extract data from the job posting pages 112 and store the extracted data as unstructured job postings 114. The extractor 110 can include or be associated with one or more robots that crawl and scrape job posting data from the job posting pages 112. Other employment-related data, such as anonymous candidate profiles, can be extracted.

A normalizer 116 can process the unstructured job postings 114 to generate normalized job postings 118. Normalizing the unstructured job postings 114 to a standard format can enable an analytics engine 120 to generate insights on job posting data. The normalizer 116 can put data from the unstructured job postings 114 into standard, common fields included in the normalized job postings 118, such as job category, skills, company, and location. The normalized job postings 118 are structured data generated from the unstructured job postings 114. The normalizer 118 can identify data in the unstructured job postings 114 that relate to given fields by parsing the unstructured job postings 114 to identify relevant sections of data. The normalizer 118 can identify relevant sections of data based on detecting certain HTML (HyperText Markup Language) codes, certain section headings, or certain keywords that are known to be dividers of certain types of information. The normalizer 116 may know a layout used by certain job posting sites 106, for example.

The identification of job posting data that relates to certain fields can be a first phase of normalization. The normalizer 116 can perform a second normalization phase to further normalize the field-based data to comply with a set of nomenclatures 122. The nomenclatures 122 are knowledge bases that include a finite number of elements and metadata for each element. For example, the nomenclatures 122 can include a nomenclature for each of multiple fields of the normalized job postings 118, such as job category, skills, company, and location. Each nomenclature can include a list of predefined concepts associated with the field. Nomenclatures 222 can be updated as new concepts are discovered. The normalizer 116 can associate a normalized job posting with a concept in a nomenclature in the nomenclatures 122 based on a similarity measure that represents a similarity between field data of the normalized job posting 118 and the concept. Similarity measures are described in more detail below.

The normalizer 116 can determine whether a given normalized job posting 118 is a duplicate of an existing normalized job posting 118. For example, an employer may have posted a same job posting to multiple job posting sites 106. The normalizer 116 can determine to not store a duplicate job posting in the normalized job postings 118. In some implementations, the normalizer 116 stores metadata about a duplicate job posting, such as maintaining a duplicate job posting count and/or storing information about which job posting sites 106 included the duplicate job posting.

An enricher 124 can enrich the normalized job postings 118 to create enriched normalized job postings 126. An enriched normalized job posting 126 can include performance data (which can be referred to as quality data or attractiveness data) associated with the job posting. Performance data can indicate an interaction count or frequency associated with a given job posting. Job posting performance information 128 can be obtained from the job posting sites 106, and/or from other sources. As another example, the enricher 124 can enrich a given normalized job posting 126 with performance data that is associated with a similar enriched normalized job posting 118.

The enricher 124 can enrich a given normalized job posting 118 with other data associated with similar enriched normalized job postings 126. For example, the given normalized job posting 118 may not have salary information, but other enriched normalized job postings 126 that have similar normalized field values may have salary information. The enricher 124 can enrich the given normalized job posting 118 with salary information that is based on the salary information associated with the similar enriched normalized job postings 126. For example, the given normalized job posting 118 can be enriched with salary information that is an average of salaries associated with the similar enriched normalized job postings 126. Similar enrichment can be performed for other fields. Normalization can enable and/or support such enrichment, since the normalized job postings 118 are all in a same common, structured format.

As another example, the enricher 124 can enrich a given normalized job posting 118 with external data 129 obtained from the one or more external data sources 105. For example, the given normalized job posting 118 can include a company name. The enricher 124 can obtain metadata associated with the company from an external data source 105 and enrich the given normalized job posting 118 with the company metadata. The external data sources 105 can include salary information, job category metadata, job skills metadata, location metadata, industry metadata, and other data.

The analytics engine 120 can analyze the enriched normalized job postings 126 to create insights about the labor market. An application server 130 can provide an application for end users, such as recruiters, business managers, etc., to view the insights and to query the enriched normalized job postings 126. For example, the application server 130 can provide an analytics application 132 for execution on the client device 104. A user can use the analytics application 132 to find information related to questions regarding difficulty of finding candidates for certain types of positions, salaries, skills, and types of contracts for certain types of positions, a number of open positions for a particular location, which job posting sites are the most successful, or which companies are hiring for different positions, to name a few examples.

As another example, a business manager can use the analytics application 132 to view information related to the hiring practices of the business, competitors of the business, or partners of the business. A recruiter can use the analytics application 132 to find information about a job, a company, a location or a skill, to optimize a recruitment campaign, or to compare a job posting to a competitor's job posting. An employment counselor can use the analytics application 132 to guide job seekers in career planning, find suitable open jobs for a job seeker client, or calculate a probability of success of a client's career plan. Decision makers can use the analytics application 132 to view a market analysis for a job category or a company, for example.

The analytics application 132 can provide job attractiveness feedback and suggestions for an employer for a particular job posting, based on job posting performance information and other data associated with similar job postings. For example, the analytics application 132 can provide suggestions for how to make the particular job posting more like successful job postings for similar positions.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140, 142, 144, and 146 are used by the client device 104, the server 102, the one or more external data sources 105, and the job posting sites 106, respectively, for communicating with other systems in a distributed environment—including within the system 100—connected to the network 107. Generally, the interfaces 140, 142, 144, and 146 each comprise logic encoded in software and/or hardware in a suitable combination and operable to communicate with the network 107. More specifically, the interfaces 140, 142, 144, and 146 may each comprise software supporting one or more communication protocols associated with communications such that the network 107 or interface's hardware is operable to communicate physical signals within and outside of the illustrated system 100.

The server 102 includes one or more processors 148. Each processor 148 may be a central processing unit (CPU), a blade, an application specific integrated circuit (ASIC), a field-programmable gate array (FPGA), or another suitable component. Generally, each processor 148 executes instructions and manipulates data to perform the operations of the server 102. Specifically, each processor 148 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 150. In some implementations, the server 102 includes multiple memories. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 107 using a wireline or wireless connection. In general, the client device 104 comprises an electronic computer device operable to receive, transmit, process, and store any appropriate data associated with the system 100 of FIG. 1. The client device 104 can include one or more client applications, including the analytics application 132. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 152. Each processor 152 included in the client device 104 may be a central processing unit (CPU), an application specific integrated circuit (ASIC), a field-programmable gate array (FPGA), or another suitable component. Generally, each processor 152 included in the client device 104 executes instructions and manipulates data to perform the operations of the client device 104. Specifically, each processor 152 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 154.

The GUI 154 of the client device 104 interfaces with at least a portion of the system 100 for any suitable purpose, including generating a visual representation of the analytics application 132. In particular, the GUI 154 may be used to view and navigate various Web pages, or other user interfaces. Generally, the GUI 154 provides the user with an efficient and user-friendly presentation of business data provided by or communicated within the system. The GUI 154 may comprise a plurality of customizable frames or views having interactive fields, pull-down lists, and buttons operated by the user. The GUI 154 contemplates any suitable graphical user interface, such as a combination of a generic web browser, intelligent engine, and command line interface (CLI) that processes information and efficiently presents the results to the user visually.

Memory 156 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 156 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 107, or any other number suitable to the purposes of the system 100. Additionally, there may also be one or more additional client devices 104 external to the illustrated portion of system 100 that are capable of interacting with the system 100 via the network 107. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
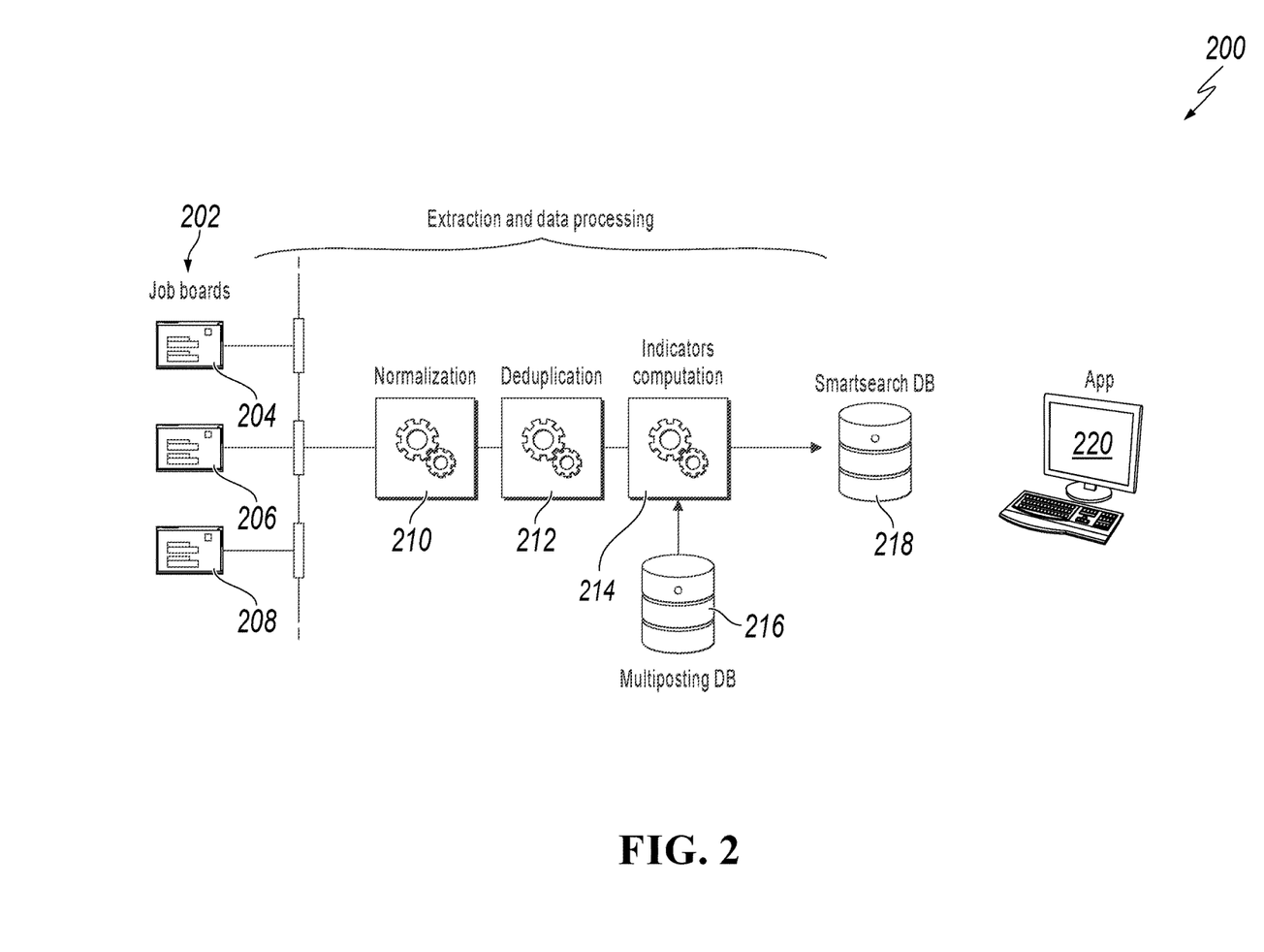
FIG. 2 is a block diagram illustrating phases of a job posting normalization and enrichment process.

FIG. 2 is a block diagram illustrating phases of a job posting normalization and enrichment job process 200. In an extraction phase 202, job posting data is extracted from various job posting sites, including job boards 204, 206, and 208. In a normalization phase 210, extracted job posting data is normalized to a common, structured format. In an a deduplication phase 212, duplicate normalized job postings are deleted or otherwise removed from further processing.

In an enrichment phase 214 (e.g., also known as indicators computation), the normalized job postings are enriched with additional data, including attractiveness/performance information from a multiposting database 216, and information from external sources. Enriched normalized job postings can be stored in a database 218. In some implementations, in the enrichment phase 214, normalized job postings are enriched using enriched normalized job postings previously stored in the database 218. The database 218 can be used by an application 220. For example, the application 220 can accept user queries and provide query responses based on the enriched electronic job postings stored in the database 218.

Figure 3:
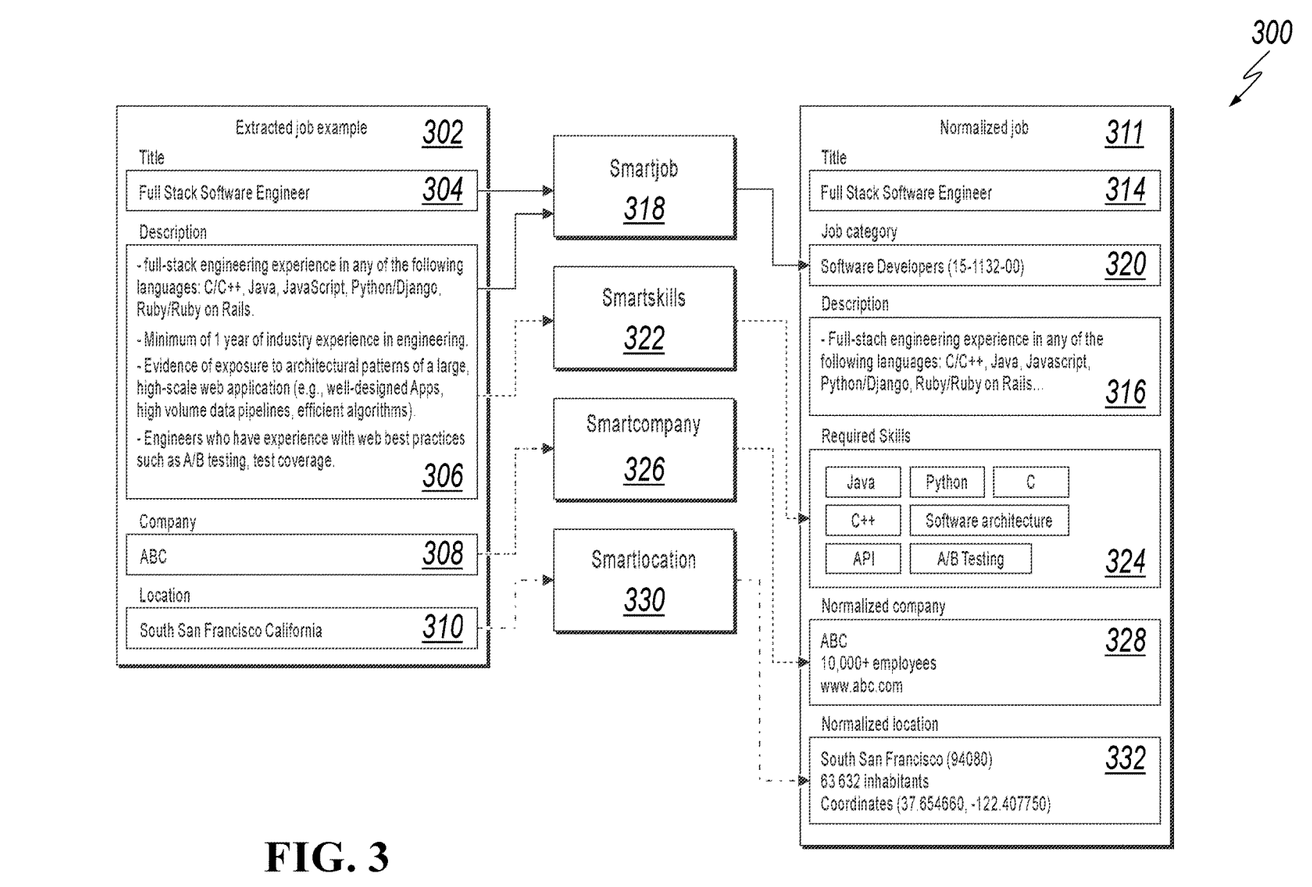
FIG. 3 illustrates a process for normalization and enrichment of an extracted job posting.

FIG. 3 illustrates a process 300 for normalization and enrichment of an extracted job posting. Extracted job posting data 302 is an output of the extraction of job posting data into a set of fields, in a first normalization phase. An extracted title 304, an extracted job description 306, an extracted company 308, and an extracted location 310 have been extracted and associated with title, description, company, and location fields, respectively.

The extracted job posting data 302 can be further normalized, and enriched, using one or more processes, to create a normalized and enriched job posting 311. In some implementations, information for some fields is copied from the extracted job data 302 to the normalized and enriched job posting 311. For example, the extracted title 304 and the extracted description 306 can be copied to the normalized job posting 316 as a title 314 and a description 316. As another example, the extracted job posting data 302 can be augmented in place with new and enriched fields to create the normalized and enriched job posting 311.

For example, a job category processor 318 ("smart job") can populate a normalized job category field 320 in the normalized and enriched job posting 316, using the extracted title 304 and the extracted description 306. A job category may not be explicitly included in a job posting, but may be represented in the job posting by one or more aspects of the job posting, such as information included in the extracted description 306 and/or the extracted title 304. A job category included in a nomenclature of predefined semantic job categories can be automatically identified. Automatically identifying a job category for a job posting from among a standard set of candidate job categories can avoid manual categorization efforts and enable an application user to browse or search for a category and explore normalized and enriched job postings that are associated with the identified category. Job category identification is described in more detail below.

A skills processor 322 ("smart skills") can identify a set of known skills 324 from the extracted description 306 based on a predefined nomenclature of skills. A company processor 326 ("smart company") can identify a known company from the extracted company 308 and include the known company name and other metadata about the company in a normalized and enriched company field 328. A location processor 330 ("smart location") can identify a known company from the extracted location 308 and include the known location name and other metadata about the location in a normalized and enriched location field 332.

To identify the normalized job category field 320, the job processor 318 can calculate a similarity measure for each of a set of known candidate categories that measures a similarity of the candidate category to the extracted title 304 and the extracted description 306 (and possibly to other data in the extracted job posting data 302). The similarity measure for a candidate category can also represent a similarity of the extracted data to metadata associated with the candidate category. A similarity measure for a candidate category can represent a probability or likelihood that the candidate category relates to the extracted data. The candidate categories can be ranked by respective similarity measures and a highest ranked candidate category can be selected for inclusion in the normalized job category field 320.

Each field of extracted data that is used in a similarity measure can have an associated weight that indicates an importance for determining the job category. For example, the extracted title 304 may have a higher weight than the extracted description 306, which may have a higher weight than the extracted company 308. Weights can be determined using machine learning. Some extracted fields, such as the extracted location 310, may have a weight of zero, meaning that they are not used for similarity calculation. A weight of zero can be determined by machine learning or can be set by an administrator.

After a job category is assigned to the normalized and enriched job posting 311, metadata associated with the job category in a job category nomenclature can be updated using information included in the normalized and enriched job posting 311. For example, the description 316 may include a keyword that is related to the software developers job category that was not previously included in metadata associated with the software developers job category. The keyword can be added to the software developer's job category metadata. The metadata for a job category can include a job category detailed description that can include a category title, typical job titles, job category description, required education, working environment, involved tasks, and required skills. Initial job category descriptions can be obtained from a national careers database, for example. The national careers database can include a list of job types known to a national occupational department, and can be updated periodically.

To compute similarity measures, the job processor 318 can represent each field of extracted data used as input to the job processor 318 (e.g., the title 304 and the description 306) as a set of input words. Each field of a candidate category detailed description can be represented as a set of category words. For each candidate category, each set of input words can be compared to each set of category words for the category.

Term frequency invert document frequency (TF-IDF) vectors can be generated for each comparison which represent whether a given input word is included in a set of category words for a candidate category. A TF-IDF vector can be generated for each combination of input field and candidate category description field. A cosine calculation can be determined for each pair of TFIDF vectors, which generally represents a proportion of words in common between an input field and a candidate category description field. An overall similarity measure for a candidate category can be calculated as a weighted sum of the cosign measures associated with the candidate category.

Figure 4:
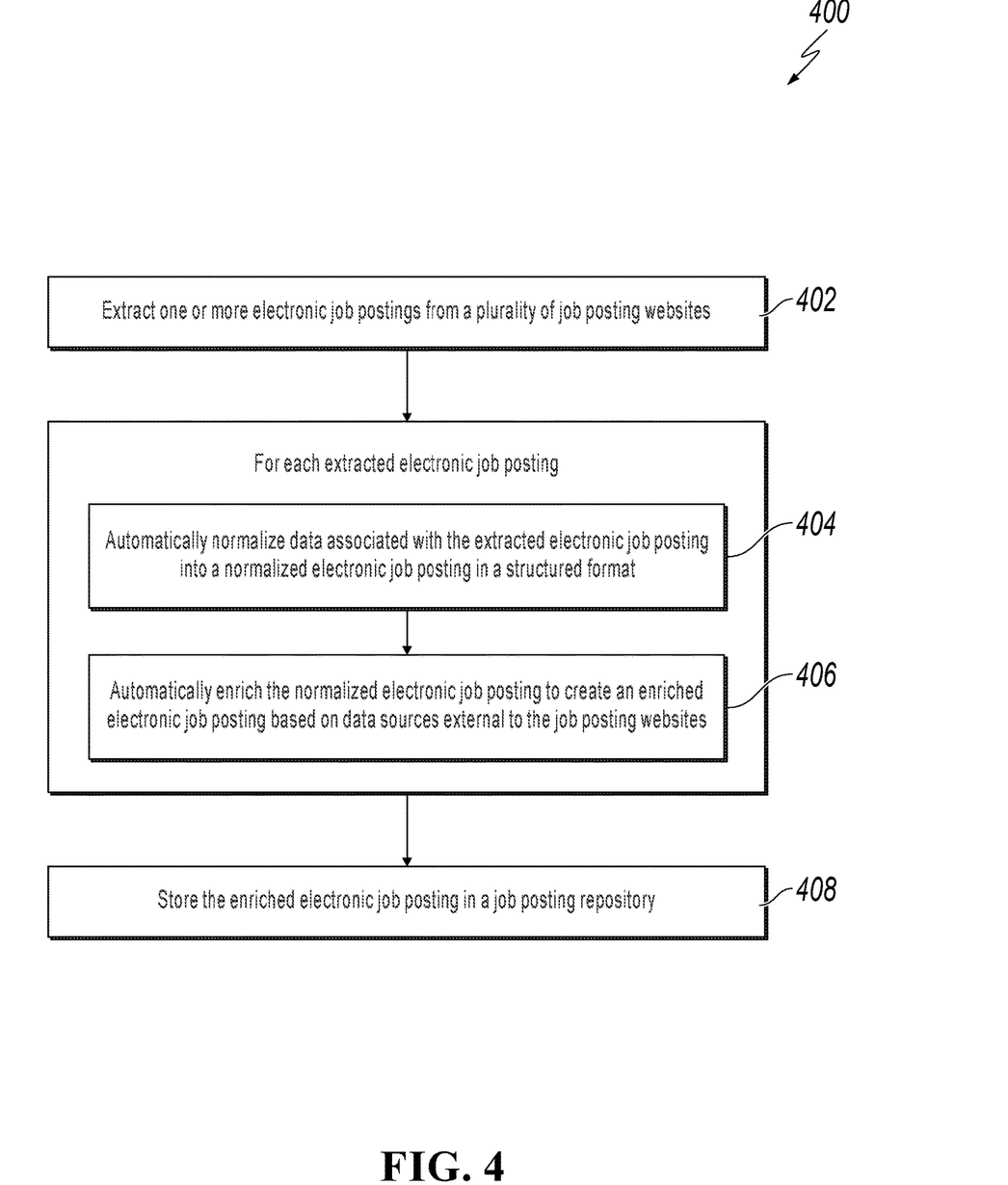
FIG. 4 is a flowchart of an example method for normalizing and enriching job posting data.

FIG. 4 is a flowchart of an example method 400 for normalizing and enriching job posting data. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the server 102 of FIG. 1.

At 402, one or more electronic job postings are extracted from a plurality of job posting websites. The extracted one or more electronic job postings can be in an unstructured format. Extracting the one or more electronic job postings can include discarding duplicate electronic job postings.

Processing steps 404 and 406 are repeated for each respective extracted electronic job posting. At 404, data associated with the respective extracted electronic job posting is normalized into a normalized electronic job posting in a structured format. Normalizing can include a first normalization step to normalize the electronic job posting in the unstructured format to an intermediate field-based format and a second normalization step to normalize the intermediate field-based format to the structured format to comply with one or more nomenclatures associated with one or more fields.

At 406, the normalized electronic job posting is automatically enriched to create an enriched electronic job posting based on data sources external to the job posting websites. Enriching the normalized electronic job posting to create the enriched electronic job posting can include automatically generating a relative evaluation of the structured data-based job postings as compared to one or more previously-normalized job postings. Enriching can include adding one or more of salary, company address, performance data, or location metadata to the enriched normalized electronic job posting.

At 408, the enriched electronic job posting is stored in a job posting repository. A query associated with the job posting repository and one or more responses to the query can be provided based on the enriched normalized electronic job postings.

Figure 5:
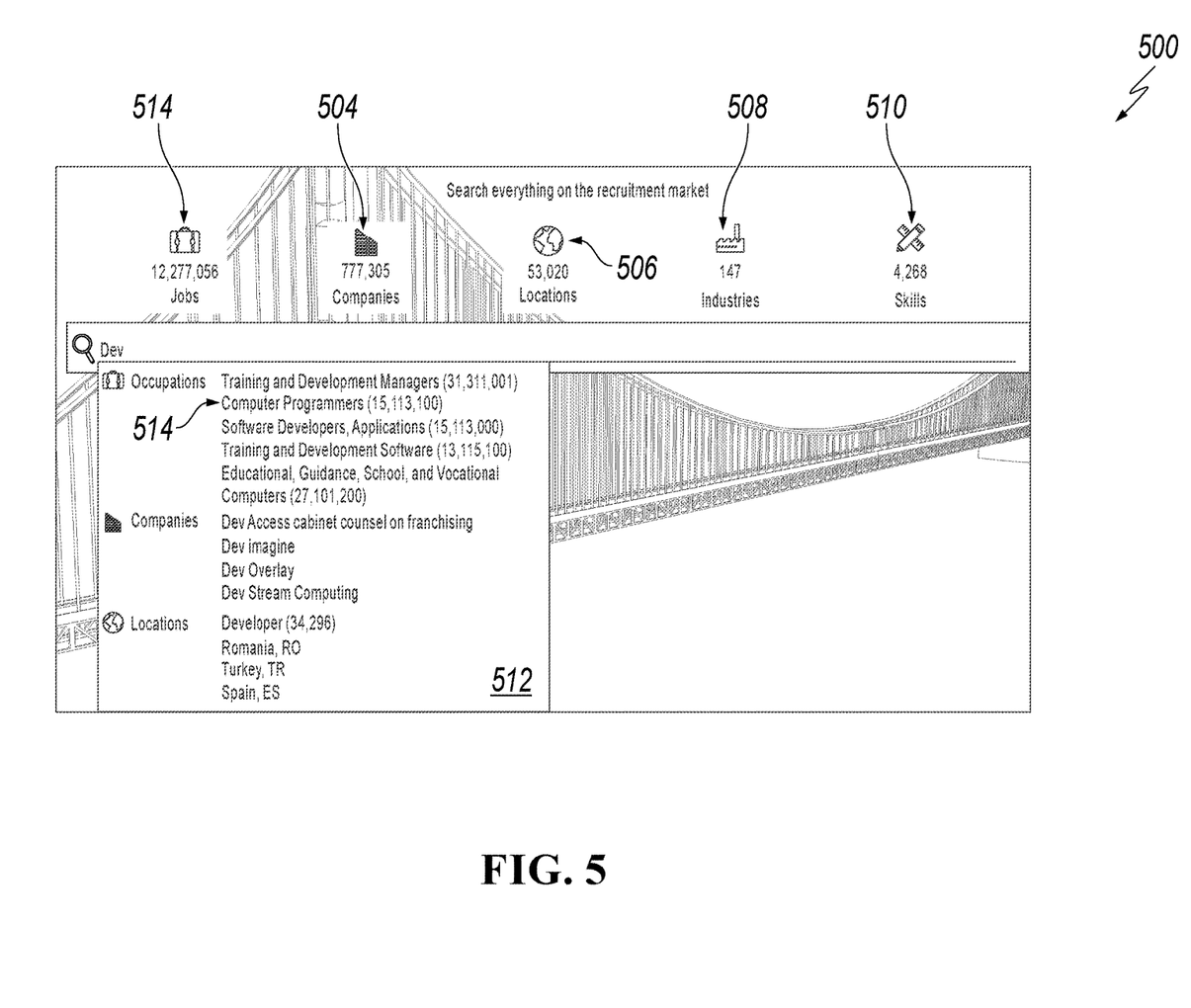
FIG. 5 is an example user interface for searching enriched normalized job postings.

FIG. 5 is an example user interface 500 for searching enriched normalized job postings. The user interface enables a user to search or browse information in an enriched normalized job posting data base. Indicators 502, 504, 506, 508, and 510 respectively indicate that the data base includes information related to 12,277,056 jobs, 777,305 companies, 53,020 locations, 147 industries, and 4,268 skills. The user can use a panel 512 to select a particular occupation, company, location, or other item to view data base information filtered by that item. For example, the user can select a computer programmers occupation 514.

Figure 6A:
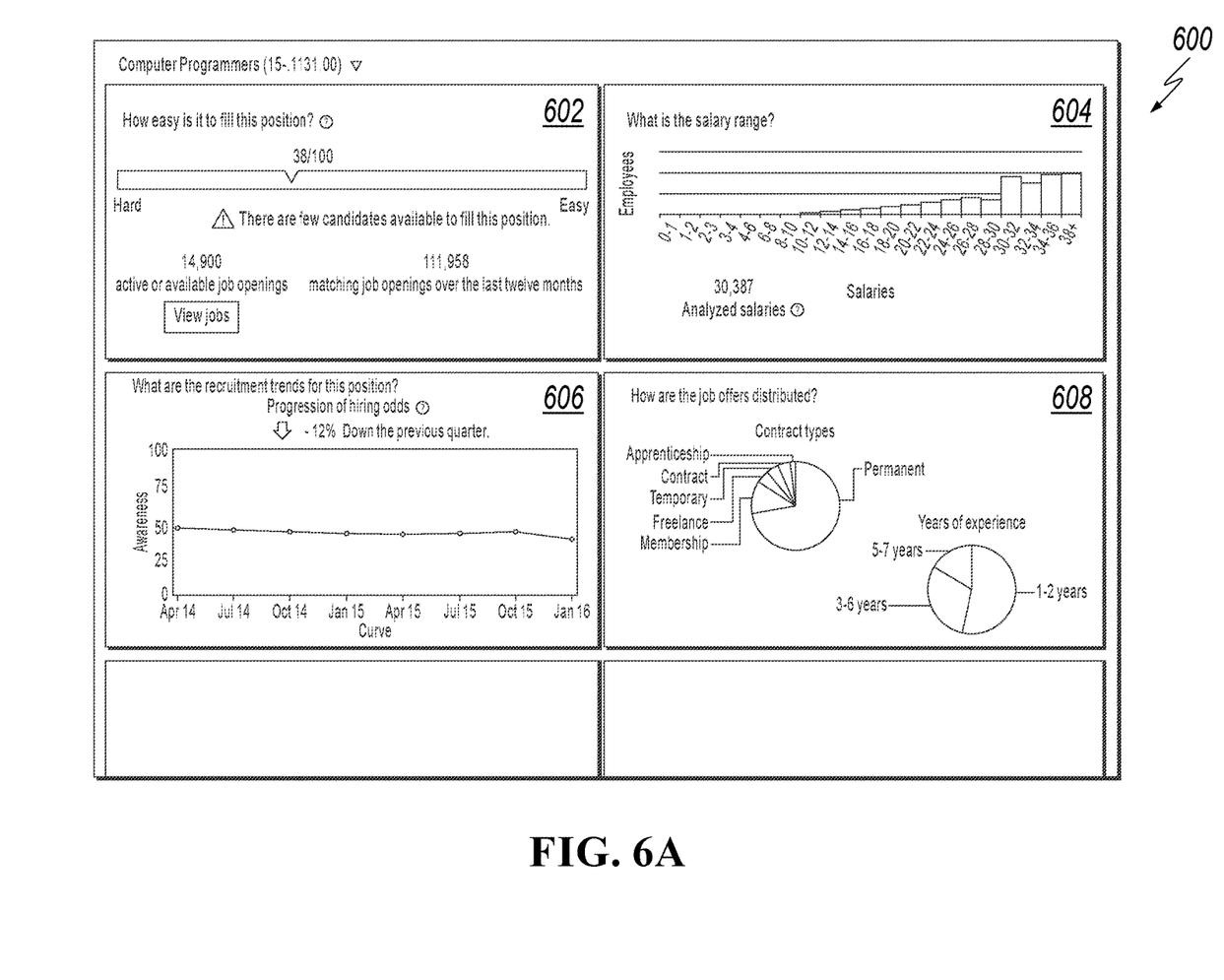
FIGS. 6A and 6B are example user interfaces for viewing labor market information for a particular occupation.

FIG. 6A is an example user interface 600 for viewing labor market information for a particular occupation. The user interface 600 can be displayed in response to the selection of a computer programmer occupation. An area 602 includes information regarding a relative difficulty of employers filling positions of the occupation. An area 604 includes salary information associated with the occupation. An area 606 includes information related to recruit trends for the occupation. An area 608 includes information regarding distribution of job postings for the occupation by contract type and desired years of experience.

Figure 6B:
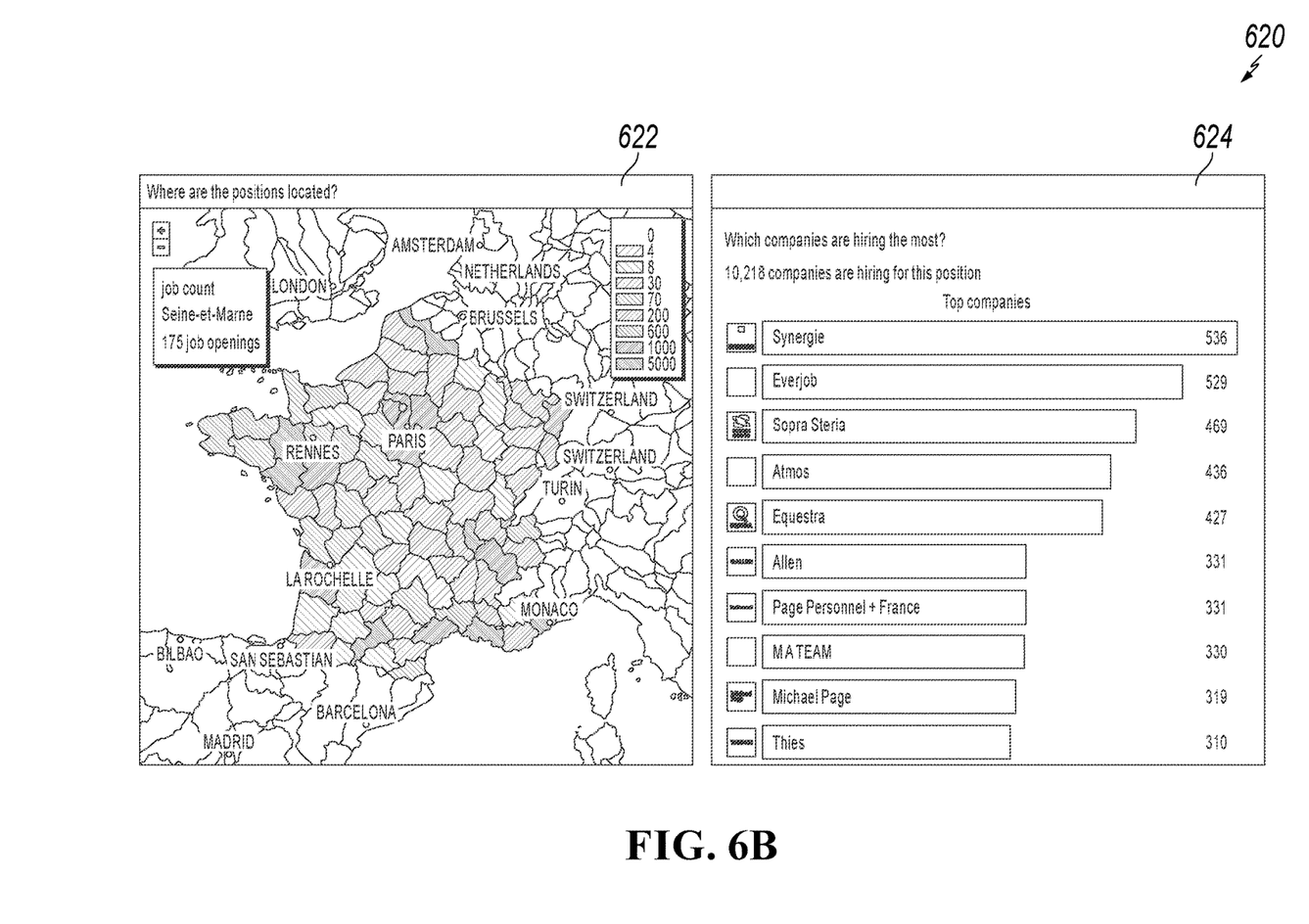

FIG. 6B is an example user interface 620 for viewing labor market information for a particular occupation. The user interface 620 can be displayed in response to the user scrolling the user interface 600 of FIG. 6A. An area 622 includes information that indicates where the positions for the occupation are located. An area 624 includes information indicating which companies are hiring for the occupation.

The user interfaces 600 and 620 can be further filtered by one or more dimensions. For example, a user can select, in a filter area (not shown), one or more of a particular location, a particular company, a particular industry, or another type of filter, to show job posting information related to the selected occupation and the selected filter item. For example, the user can select a location of Paris to see information about computer programmer job openings in Paris. Other types of user interfaces can be displayed, such as interfaces that show detailed specific information about job posting sites, company profiles, locations, or industries. A search engine interface can accept a free-form search, as well as selection from a list of predefined items (occupations, locations, etc.). Information from enriched normalized job postings can be returned in response to a query or a selection. Job posting performance and attractiveness information can be used to rank information displayed in response to a search or a selection.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 200 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method comprising:
   extracting one or more electronic job postings from a plurality of job posting websites; and
   for each extracted electronic job posting:
      automatically normalizing data associated with the extracted electronic job posting into a normalized electronic job posting in a structured format;
      automatically enriching the normalized electronic job posting with data external to the electronic job posting, to create an enriched electronic job posting, based on data sources external to the job posting websites, wherein the enriching includes adding, to the enriched electronic job posting, at least one external data based field that was not included in the normalized electronic job posting and automatically generating a relative evaluation of the structured data-based job postings as compared to one or more previously-normalized job postings; and
      storing the enriched electronic job posting in a job posting repository.

2. The computer-implemented method of claim 1, wherein the extracted one or more electronic job postings are in an unstructured format.

3. The computer-implemented method of claim 1, wherein the structured format is used for all extracted electronic job postings.

4. The computer-implemented method of claim 1, wherein extracting the one or more electronic job postings comprises discarding duplicate electronic job postings.

5. The computer-implemented method of claim 1, wherein enriching the normalized job posting to create the enriched electronic job posting comprises adding one or more of salary, company address, performance data, or location metadata to the enriched job posting.

6. The computer-implemented method of claim 1, further comprising:
   receiving a query associated with the job posting repository; and providing one or more responses to the query based on the enriched electronic job postings.

7. A system comprising:
one or more computers; and
a computer-readable medium coupled to the one or more computers having instructions stored thereon which, when executed by the one or more computers, cause the one or more computers to perform operations comprising:
    extracting one or more electronic job postings from a plurality of job posting web sites; and
    for each extracted electronic job posting:
        automatically normalizing data associated with the extracted electronic job posting into a normalized electronic job posting in a structured format, wherein normalizing includes a first normalization step to normalize the electronic job postings in the unstructured format to an intermediate field-based format and a second normalization step to normalize the intermediate field-based format to the structured format to comply with one or more nomenclatures associated with one or more fields;
        automatically enriching the normalized electronic job posting with data external to the electronic job posting, to create an enriched electronic job posting, based on data sources external to the job posting websites, wherein the enriching includes adding, to the enriched electronic job posting, at least one external data based field that was not included in the normalized electronic job posting; and
        storing the enriched electronic job posting in a job posting repository.

8. The system of claim 7, wherein the extracted one or more electronic job postings are in an unstructured format.

9. The system of claim 7, wherein the structured format is used for all extracted electronic job postings.

10. The system of claim 7, wherein extracting the one or more electronic job postings comprises discarding duplicate electronic job postings.

11. The system of claim 7, wherein enriching the normalized job posting to create the enriched electronic job posting comprises adding one or more of salary, company address, performance data, or location metadata to the enriched job posting.

12. A computer program product encoded on a non-transitory storage medium, the product comprising non-transitory, computer readable instructions for causing one or more processors to perform operations comprising:
    extracting one or more electronic job postings from a plurality of job posting websites; and
    for each extracted electronic job posting:
        automatically normalizing data associated with the extracted electronic job posting into a normalized electronic job posting in a structured format;
        automatically enriching the normalized electronic job posting with data external to the electronic job posting, to create an enriched electronic job posting, based on data sources external to the job posting websites, wherein the enriching includes:
            adding, to the enriched electronic job posting, at least one external data based field that was not included in the normalized electronic job posting;
            automatically identifying a job category associated with the electronic job posting, based on information included in the electronic job posting and metadata associated with the job category; and
            assigning the automatically identified job category to the electronic job posting;
        after assigning the automatically identified job category to the electronic job posting, identifying a keyword in the electronic job posting that is not included in the metadata associated with the job category;
        adding the keyword to the metadata associated with the job category; and
        storing the enriched electronic job posting in a job posting repository.

13. The computer program product of claim 12, wherein the extracted one or more electronic job postings are in an unstructured format.

14. The computer program product of claim 12, wherein extracting the one or more electronic job postings comprises discarding duplicate electronic job postings.

15. The computer program product of claim 12, wherein enriching the normalized job posting to create the enriched electronic job posting comprises adding one or more of salary, company address, performance data, or location metadata to the enriched job posting.

\* \* \* \* \*